(12) United States Patent
Melgosa Arcos

(10) Patent No.: US 10,702,728 B2
(45) Date of Patent: Jul. 7, 2020

(54) CONSTANT FLOW VALVE FOR FIRE PROTECTION FACILITIES

(71) Applicant: RG GREEN SYSTEMS, S.L., Villalonquejar, Burgos (ES)

(72) Inventor: Raul Melgosa Arcos, Burgos (ES)

(73) Assignee: RG GREEN SYSTEMS, S.L., Villalonquejar, Burgos (ES)

( * ) Notice: Subject to any disclaimer, the term of this patent is extended or adjusted under 35 U.S.C. 154(b) by 0 days.

(21) Appl. No.: 15/749,940

(22) PCT Filed: Apr. 26, 2016

(86) PCT No.: PCT/ES2016/070308
§ 371 (c)(1),
(2) Date: Feb. 2, 2018

(87) PCT Pub. No.: WO2017/021572
PCT Pub. Date: Feb. 9, 2017

(65) Prior Publication Data
US 2018/0229061 A1    Aug. 16, 2018

(30) Foreign Application Priority Data
Aug. 6, 2015   (ES) ................... 201530922 U

(51) Int. Cl.
*F16K 31/12*   (2006.01)
*A62C 35/68*   (2006.01)
(Continued)

(52) U.S. Cl.
CPC .......... *A62C 35/68* (2013.01); *A62C 99/0018* (2013.01); *G05D 16/166* (2013.01); *G05D 16/187* (2019.01)

(58) Field of Classification Search
USPC .................................. 251/30.01, 63.4, 63.5
See application file for complete search history.

(56) References Cited

U.S. PATENT DOCUMENTS 2,771,094 A    11/1956    Bailey
3,982,559 A *  9/1976    Ochs ................... G05D 16/0652
                                                    137/455
(Continued)

FOREIGN PATENT DOCUMENTS

EP    1869534 B1    12/2009
EP    2241794 A1    10/2010
(Continued)

OTHER PUBLICATIONS

International Search Report dated Jul. 13, 2016 for International Application No. PCT/ES2016/070308 filed Apr. 26, 2016.
(Continued)

*Primary Examiner* — Robert K Arundale
(74) *Attorney, Agent, or Firm* — Blue Filament Law PLLC

(57) ABSTRACT

A valve controls the discharge of fluid stored under pressure in cylinders (4) and includes a body (2) with a fluid inlet hole (3), a fluid outlet hole (5), and a sealing shaft (6) whose movement, determined by release means (7), opens or closes the fluid passage The release means (7) includes at least one pneumatic actuation hole (11) with non-return valve (12) and a hermetic chamber (10) associated with said sealing shaft (6), a pressure cartridge (8) of compressed gas associated with an electric and manual actuator (9) external to the body (2) and the hermetic chamber (10), which, transmits the motion to a rod (15) linked to said sealing shaft (6). A spring (16) tends to keep the sealing shaft (6) closed, when the pressure is zero or when the cylinder (4) is empty.

10 Claims, 2 Drawing Sheets

(51) Int. Cl.
*A62C 99/00* (2010.01)
*G05D 16/18* (2006.01)
*G05D 16/16* (2006.01)

(56) References Cited

U.S. PATENT DOCUMENTS

| | | | | |
|---|---|---|---|---|
| 4,054,156 A | * | 10/1977 | Benson | F02D 9/06 |
| | | | | 123/323 |
| 4,508,132 A | * | 4/1985 | Mayfield, Jr. | F16L 55/00 |
| | | | | 137/468 |
| 4,592,383 A | | 6/1986 | Rikuta | |
| 5,632,466 A | * | 5/1997 | Ochs | F16K 31/1221 |
| | | | | 251/63.5 |
| 5,755,428 A | * | 5/1998 | Ollivier | F16K 7/14 |
| | | | | 251/331 |
| 6,431,465 B1 | | 8/2002 | Yie | |
| 8,079,567 B2 | | 12/2011 | Beucher et al. | |
| 9,506,572 B2 | * | 11/2016 | Hirai | G05D 7/03 |
| 2010/0163765 A1 | | 7/2010 | Gregoire | |
| 2010/0288517 A1 | | 11/2010 | Fanping et al. | |

FOREIGN PATENT DOCUMENTS

| | | |
|---|---|---|
| EP | 2770396 A2 | 8/2014 |
| WO | 2004079678 A2 | 9/2004 |
| WO | 2006108931 A1 | 10/2006 |
| WO | 2007073390 A1 | 6/2007 |
| WO | 2010149639 A1 | 12/2010 |

OTHER PUBLICATIONS

European Search Report dated Nov. 28, 2016 for European Application No. EP 16382180 filed Apr. 26, 2016.

\* cited by examiner

CONSTANT FLOW VALVE FOR FIRE PROTECTION FACILITIES

OBJECT OF THE INVENTION

The invention, as expressed in the title of this patent specification, refers to a constant flow valve, which has advantages and features, which will be described in detail below, representing a remarkable novelty in the current state of the art.

The object of the present invention lies, namely, in a valve to control discharge of pressurised stored gas in preferably cylindrical tanks, hereinafter "cylinders", of a fire fighting installation, which presents an innovative structural configuration that improves effectiveness and provides benefits to the entire installation involving a remarkable improvement compared to that which is currently known for the same purpose.

TECHNICAL FIELD OF THE INVENTION

The technical field of the present invention falls within the sector of the fire protection industry dedicated to the manufacture of valves, in particular control valves for fluid discharge from a container or cylinder, which stores said fluid under high pressure.

BACKGROUND OF THE INVENTION

One of the most common extinguishing agents for automatic fire suppression are gas systems, especially HFCs, inert gases and $CO_2$.

The growing concern for the environment and the need to reduce gases with high global warming effect (GWP) are leading consumers to opt for organic gases and regulating bodies to limit or prohibit the use of HFC. This new regulatory framework has an important effect on the choice of the extinguishing agent used in fire extinguishing systems. Limiting the use of HFCs and changing consumer preferences toward gases less harmful to the environment has led to a growth in consumption of inert gases, which are 100% organic.

Inert gases used in fire extinguishing are nitrogen, argon and combinations thereof, alone or with other gases. Due to their nature, inert gases are stored in gaseous state rather than in fluid state requiring storage pressures higher than HFC. Currently the most common are 150 bars, 200 bars and 300 bars, but other pressures can be operated. This requires that all elements of the installation must be designed and manufactured to withstand a pressure higher than the working or storage pressure, which according to regulations must be one and half times the working or storage pressure. Obviously, the higher the pressure that an element must resist, greater is the cost of manufacture, and therefore it is less competitive.

On the other hand, the higher the pressure of the gas, greater will be the distance covered and less the time of discharge. However, high discharge pressures generate overpressure in the space to be protected, which can damage the contents of the room; therefore, it is necessary to provide anti-overpressure measures that make installations more burdensome.

In firefighting installations using inert gas, the gas is stored in a cylinder in which a valve is assembled that controls the discharge of said gas. In standard installations the valve does not regulate the gas outlet, whereby the outlet pressure of the valve is the same as the pressure in which the gas is stored in the cylinder, that is, if the gas pressure in the container is 300 bars, the initial outlet pressure will also be 300 bars. The pressure is maintained at 300 bars on all the components until reaching the collector connection with the pipe where a restrictor with a disc with an opening is placed reducing the pressure to 60 bars. These installations are also called opening installations.

There are also the so-called constant flow installations, in which the valve regulates the outlet pressure of the gas, so that different pressures to those of the stored gas are achieved. This enables using lower pressure components and, therefore, they are cheaper.

It is also important to note that the amount of gas required for a proper extinction, within the parameters defined by regulations, is defined by the hydraulic calculation. A hydraulic calculation that is made correctly should take into account the highest peak of pressure, even if it is only for milliseconds. The hydraulic calculation takes into account the behaviour of the pressure and gas flow from the discharge port of the valve, thus a regulated but constant discharge will be easier to reproduce in the hydraulic calculation algorithm than an inconstant discharge, with pressure peaks or with pulsating pressures.

Another important factor for calculating the amount of gas is the outlet flow rate of the valve; therefore, it is critical in the design of the valve that the regulation is made with minimum load loss and with the maximum free flow section possible. A constant and consistent discharge helps the hydraulic calculation to be more efficient and permits the reduction of the diameter of the discharge pipe, making the installation more economic.

An installation of automatic extinguishing through gas essentially comprises the following:
- a gas containment vessel, usually called cylinder or tank
- a discharge valve
- release installations
- pressure control installations (pressure gauges, pressure switches . . . )
- a gas
- connecting tubes
- non-return valves
- pipes and collectors to channel the gas
- directional valves
- other non-relevant elements such as hardware
- a hydraulic calculation to ensure that the installations discharge under certain regulatory conditions. This means that it discharges a certain amount of gas in a limited time. Among other parameters, this is determined by the discharge pressure of the gas and the outlet flow rate of this gas.

The gas discharge valve has several main functions: retaining the gas in the cylinder when it is at rest; discharging the gas as needed; and, in the case of regulated valves, reducing the outlet pressure.

Each gas valve comprises a body, chambers and internal passages for gas to flow through and a means of releasing or opening. In addition, most current valves also incorporate a main shaft which shuts off the outlet of gas, and a spring that helps its operation.

As the closest documents of the state of the art to the object of the present invention, should be mentioned the following: WO2006/108931/EP1869534B1/U.S. Pat. No. 8,079,567B2 (Siemens); WO2004/079678 (Fike Corp.); WO2007/073390 (Chubb LTD); EP2241794A1 (LPG Técnicas en Extinción de Incendios SL).

The patent WO2004079678 (Fike) describes a system with a regulated discharge valve. This valve regulates the outlet pressure of the gas balancing the pressure between the different effective surfaces of several chambers, the opening and closing effect of a moveable shutter and the scaling of a spring that biases the shutter. The main element that regulates the gas is the filling and emptying of a chamber and the force of a spring which means that the regulation is pulsating, whereby a consistent regulation is not achieved. In addition, the correct functioning of this system depends on the balance with the spring pressure, rather, with its scaling, and due to the size of those springs achieving uniformity is productively very expensive, so it is likely that there be a variation between the different units, therefore the discharge pressure varies. If in the scaling of the spring a significant variation is allowed, this causes the regulation of one valve to another to vary quite a lot and affects the accuracy of the hydraulic calculation. In fact, the valve has a manual adjustment screw.

On the other hand, this type of regulation has the drawback that the dynamic balance achieved during the discharge is different from the static balance, which means that there is a pressure peak at the initial time of discharge. This valve has a very important problem, which consists in its not achieving the pressure balance if, for any reason, the duct outlet or installation does not allow discharge. That is, if the duct outlet is blocked, for example due to a malfunction of a directional valve, the discharge pressure could increase up to 300 bars, which is a risk if the adequate overpressure measures were not taken, but it also entails that, for the hydraulic calculation, the outlet pressure of 300 bars must be taken into consideration. Another reason for an improper balance of pressures is that the spring loses tension over time, resulting in an uncertainty in not knowing exactly at what pressure it will regulate. In addition, the spring can be compressed as a block into its opening, which prevents it from regulating the valve.

Patent EP2241794A1 (LPG) also describes a regulated discharge valve. As the previously described valve from the Fike Corporation, regulation is achieved between different effective surfaces and a mobile element, a shutter, which moves by opening and closing the outlet passageway. In this case, the balance is achieved using a coil spring, with the same scaling problems already mentioned above, since for the scaling of the spring to be exact it must be regulated one by one manually. Unlike the Fike valve, this valve needs pressure to push down a piston which allows the outlet of gas and, therefore, the operation of flows and balances is different.

However it presents exactly the same problem of dynamic balance other than static balance. In this case, the chamber design prevents that the pressure reaches 300 and it is regulated at about 100 bars, but this pressure entails the use of components and pipes of greater pressure, and therefore of higher manufacturing cost. At the same time, if the gas outlet is blocked in a haphazard way, the pressure of the gas will increase one and a half times above the discharge pressure desired, since to achieve the balance of pressures, it needs the outlet port to be open. If this is closed, the balance is achieved at a pressure greater than that desired.

Patent WO 2006/108931 (Siemens) also describes a regulated discharge valve of similar operation to that from LPG, and thus, with the same problems. Additionally, in this case, the designs of the chambers and passage ways are very small; hence the outlet flow rate is very low, which makes it a fairly inefficient valve for discharge. The lower the flow rate, the more time it takes to discharge.

The three valves briefly described have approximate outlet pressures and important variations from one valve to another.

The objective of the present invention is, therefore, the development of a new valve of the type mentioned that solves the indicated disadvantages which the hitherto known valves have, and which are summarised, basically, in:
   that the regulation of the outlet pressure is performed based on the geometry of the valve for its reduction with respect to the pressure stored;
   that the gradual loss of pressure of the gas contained in the cylinder, upon opening the valve, affects the outlet pressure;
   that the peak of pressure that occurs at the time of opening of the valve must be withstood by said valve and by the other elements of the installation;
   that the spring is always manufactured with exact precision and scaled to not vary in its work of retention or affect the outcome of the outlet pressure obtained;
   that the valve must be designed, in each case, depending on the pressure under which the gas is stored in the cylinder;
   that the outlet flow is perpendicular to the inlet flow, and therefore to the axis of the mouth of the cylinder, limiting the design of the arrangements of the installation;
   that allows a greater pipe route;
   that has a greater discharge flow;
   that must be suppressed by the scaling springs that limit the discharge flow; and
   that the valve can be regulated at various discharge pressures.

Finally, it should be noted that a valve regulated under pressures below 60 bars brings significant advantages to the installation. The more load pressure of the gas, the greater the volume that can be placed in a cylinder and therefore less cost per $Kg/m^3$ of gas. The other components of a system and their cost are determined largely by the pressure to which they will be subjected in a discharge. The lower the discharge pressure the lower the cost of the components. Therefore the cost of installation is determined by a balance between the pressure under which the gas is stored in the cylinder and the pressure at the time of discharge. A lower discharge pressure also entails less excess pressure in the protected room and, therefore, lower costs of installation. Significant savings are generated below 60 bars.

DESCRIPTION OF THE INVENTION

The constant flow valve that the invention proposes, is configured, thus, as a remarkable novelty within its technical field, since, according to its implementation, the previously designated targets are satisfactorily achieved, the characterised features that make it possible and that distinguish it from what is already known being conveniently gathered in the end claims that accompany this patent specification.

Specifically, what the invention proposes is a constant flow valve applicable for the discharge control of gas stored under pressure in cylinders of a fire protection installation with the function of retaining the gas in the cylinder when it is at rest, discharging the gas when needed, and reducing the pressure outlet, said valve having an innovative structural configuration that improves its efficiency.

Advantageously, with the innovations of the valve of the invention the problem of difference of dynamic balance and static balance is solved by providing a release pressure in an external way, independent of the pressure stored in the cylinder, and this release pressure is stored in a hermetic chamber and is kept constant during the entire discharge.

The valve of the invention has been designed so that the valve outlet pressure is equal to the inlet pressure in said chamber, i.e., if a release pressure of 50 bars is used, the outlet pressure will be 50 bars, if a pressure of 15 bars is used the outlet pressure will be 15 bars, and this relationship is maintained with the same valve be the pressure stored in the cylinder of 150 bars, 200 bars, 300 bars or any other pressure.

In addition, the valve of the invention works by a pneumatic opening produced by the inlet of the released gas in the hermetic chamber, therefore, the effect that the scaling of the spring has is practically zero, since it is only for the piston to return to its position, so that there is no fluctuating dynamic balance during the discharge.

Likewise, the valve of the invention presents a configuration comprising a piston, whose axis is horizontal, and a form of closure which has been designed for when the gas is at rest, considering, on the other hand, that the outlet flow occurs in the same direction as the inlet flow, i.e. aligning itself with the axis of the mouth of the cylinder, rather than being perpendicular to it. This makes the rest of the system easier to design and install, since the position of the cylinder is given by the pressure gauge, as it does not have a side outlet which obliges the connecting tubes and the collector to be designed according to that indicated.

With all the above, the advantages of the valve are, essentially, that they allow discharging throughout the time of discharge with a regulated, constant and consistent pressure. This fact makes it easier to represent the discharge in the hydraulic calculations of the installation and, together with the large section of free passage that this valve has, it allows the use of smaller diameter pipes, optimising the discharge network.

A discharge pressure regulated, constant and without pressure peaks allows that the components and pipes to be used be under lower pressure than one that has peaks.

The valve is safer, since the discharge pressure is regulated even if the outlet port is blocked. If the valve outlet is blocked for any reason (retention valve incorrectly placed, etc.) the discharge pressure would be the regulated pressure, i.e., it would not increase.

The pneumatic regulation is cheaper to manufacture than an installation that balances pressures with a spring as a critical element of the same. In addition, this mode of regulation requires fewer passageways and chambers, so the valve is cheaper to manufacture. Besides achieving a larger section of free flow with a smaller volume of valve, as a valve with spring as a critical element is bigger, the manufacture of the valve of the invention is cheaper as it contains less brass.

This configuration allows the design of a valve with much higher flow rate, which is a very important advantage in the reduction of the diameter of the discharge pipe and also in the discharge time.

The fact that the valve design allows regulating the outlet pressure exactly to the inlet pressure of the release means, allows said gas to be a more efficient propulsion system for other fire extinguishing agents, e.g., water mist, HFC's, foams, or dust.

The valve design allows using the same valve for different storage pressures in the cylinder. Currently, the most common are inert gases at 150 bars, 200 bars or 300 bars, but it could also be used for lower or higher pressures without any modifications, as well as being able to be used with $CO_2$.

The described constant flow valve for fire protection installations is, therefore, an innovative structure of features unknown to date for the purpose, for which it is intended, reasons that together with its practical usefulness, endow it with sufficient basis for the privilege of exclusivity that is requested.

DESCRIPTION OF THE DRAWINGS

To complement the description being made and to assist in a better understanding of the features of the invention, a set of drawings is attached to the present specification as an integral part thereof, wherein in an illustrative and non-limiting way, the following has been represented.

PREFERRED EMBODIMENT OF THE INVENTION

Figure 1:
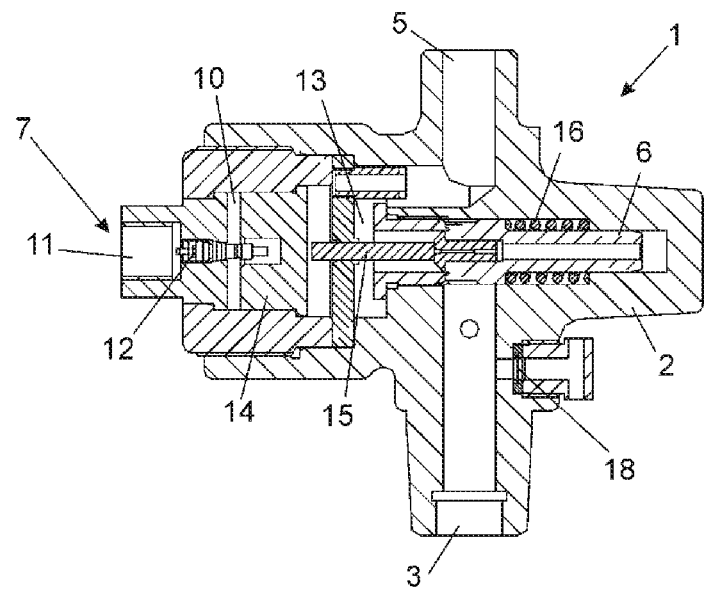
FIG. 1 shows a sectional schematic view of a preferred embodiment of the constant flow valve, object of the invention, which has been represented in the closed position, whose main parts and elements can be seen.

In view of the mentioned figures and according to the adopted numbering, a non limiting example of the constant flow valve of the invention can be seen in them comprising the parts and elements that are described in detail below.

As shown in these figures, the valve (1) in question comprises a body (2) having a fluid inlet hole (3), suitable to be coupled to the mouth of the cylinder (4) containing the fluid under pressure, a fluid outlet hole (5), suitable for its coupling to the piping of the installation and a sealing/closing shaft (6) whose movement, which is determined by release means (7), opens or closes the passage of the fluid on the inside of the body (2) from the inlet (3) to the outlet (5).

From this already known configuration, the valve of the invention (1) is distinguished by the fact that the regulation of the pressure of the fluid at the outlet (5) is determined by the release means (7) which are pneumatic, which are determined by the pressure exerted by a cartridge, bottle or any other source of pressure (8) of compressed gas associated with an actuator (9) external to the body (2) of the valve (1), and through which the desired pressure is applied in a hermetic chamber (10) provided for in the body (2) of the valve (1), this pneumatic pressure being a constant, pre-set pressure, which determines at the time the controlled movement of the sealing/closing shaft (6) and, consequently, the opening of the valve (1).

Figure 2:
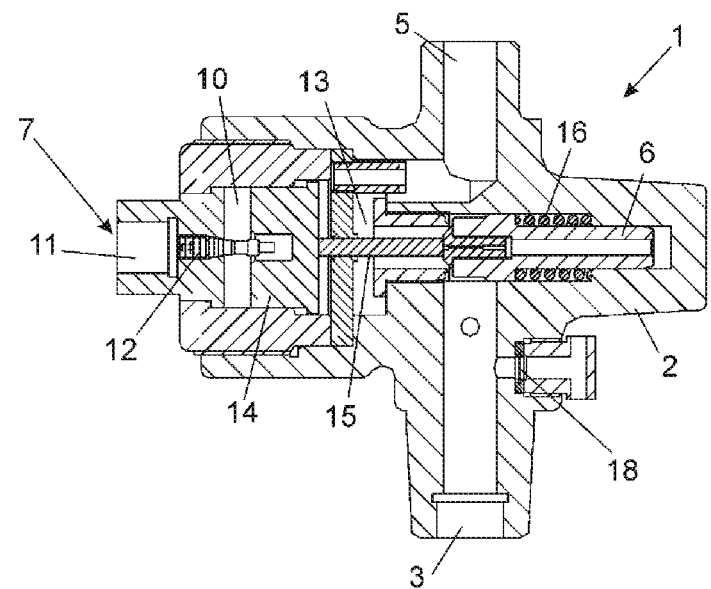
FIG. 2 shows a view of the valve of the invention that is similar to the previous one, in this case, represented in the open position.

More specifically, the body (2) has an actuation hole (11) through which the gas is introduced under a pre-set pressure from a cartridge, bottle or any other source of gas pressure (8) to which the cited release means (91-92-9) are connected, and that, through a non return valve (12), allows the entry of the gas to the hermetic chamber (10). This hermetic chamber (10), which is independent from the passage chamber (13), is responsible for the movement of the sealing shaft (6) that, when the valve (1) is open (FIG. 2), allows the passage of the fluid in a controlled manner from the inlet (3) to the outlet (5). In FIG. 1 the valve is closed.

On the other hand, the hermetic chamber (10) is associated with a piston (14) that slides depending on the pressure exerted in said hermetic chamber (10), so the higher the pressure, the more the piston (14) moves. In turn, the movement of the piston (14) transmits the motion to a rod (15) which is linked to the sealing/closing shaft (6) whose movement opens or closes more or less the passage of flow through the passage chamber (13) depending on the pressure of the said hermetic chamber (10).

It is noteworthy that the valve (1) not only opens or closes the fluid flow from the cylinder (4), but it also regulates the outlet pressure or discharge of said fluid, i.e., the valve (1) also functions as a pressure reducing device. Usually, the cylinder containing the fluid is under a pressure of 150, 200 or 300 bars, and is capable of having others, but the outlet pressure is given by the driving pneumatic pressure, i.e., if there is no pressure in the actuation hole (11) and therefore in the hermetic chamber (10), the valve (1) is kept closed. If in this hole (11) and said chamber (10) the pressure is 15 bars, then the outlet pressure will be 15 bars, and if the pressure in the actuation hole (11) and hermetic chamber (10) is 60 bars the outlet pressure will be 60 bars, etc., regardless of the inlet pressure of the fluid from the cylinder (4).

In short, therefore, the release means (7) are pneumatic, comprising at least the actuation hole (11) and the hermetic chamber (10), which are associated to the sealing shaft (6) such that they determine the regulation of the fluid pressure in the outlet (5) causing the outlet pressure to be given by the driving pneumatic pressure, regardless of the inlet pressure of the fluid from the cylinder (4).

Furthermore, the valve is closed only when the pressure in the pneumatic actuation hole (11) and the hermetic chamber (10) is zero thanks to there being a spring (16) which tends to maintain the sealing shaft (6) of the valve closed, but which is not affected by the inlet pressure as said sealing shaft (6) is arranged perpendicularly to the flow inlet hole (3). Specifically, the entire assembly of pneumatic movement, i.e., the piston (14), rod (15) and sealing shaft (6) are arranged perpendicularly to the flow inlet hole (3) and move perpendicularly to said inlet hole (3). Also the actuation hole (11) is arranged perpendicularly to the inlet hole (3) while the outlet hole (5) is axially aligned with the inlet hole (3).

Thus, the valve opening (1) is performed when pressure is exerted on the actuation hole (11). When said hole is pressurised, the pressure passes into the hermetic chamber (10), where it remains due to the existence of the non-return valve (12) permitting the flow of pneumatic gas into said chamber, but not its relief.

Therefore, with the existence of the non-return valve a regular flow of the pressure in the pneumatic actuation hole (11) is not necessary. A cartridge (8) filled with gas under the desired pressure is sufficient.

The sealing shaft (6) and the piston (14) are linked so that if one moves, the other is also displaced. Thus, when there is no driving pressure and the shaft closes the valve, due to the action of the spring (16), the piston (14) also moves. Likewise, when there is driving pressure in the hermetic chamber (10), the piston (14) moves, which, in turn, moves the shaft (6) and determines the opening of the valve.

Figure 3:
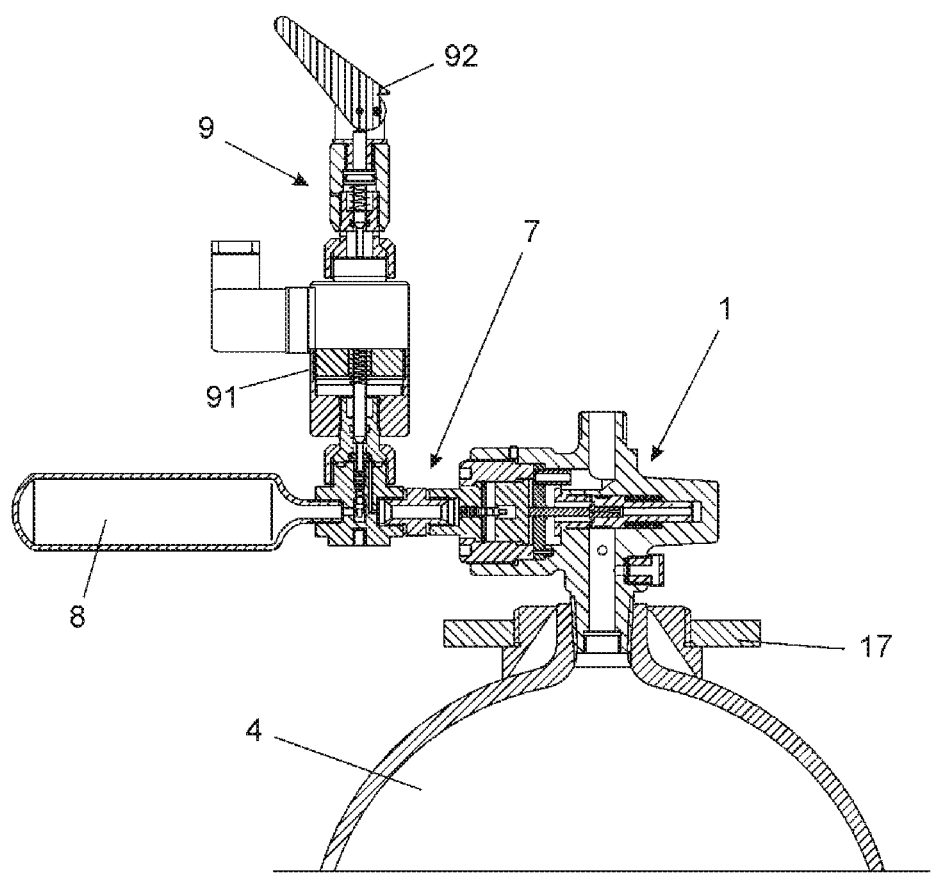
FIG. 3 shows a sectional view of the valve itself, according to the invention, once attached to the cylinder and connected to the cartridge of compressed gas that drives its opening.

To introduce pressure through the actuation hole (11) with the cartridge or bottle or any other source of pressure (8) of pressurised gas, the incorporation of the actuator (9) is contemplated, which is preferably of electric type (91), but may also be manual (92), or the combination of both types, in which case, as shown in FIG. 3, the manual type (92) is mounted on the electric one (91). Apart from these two actuators, there are many more types, such as pneumatic, pneumatic-manual, pyrotechnic, etc., types, with the electric and manual actuator being the most commonly used.

The cartridge, bottle or any other source of pressure (8), preferably is a cartridge of 0.08 or 0.18 litres or a bottle of 2, 6.7 or 13.4 litres or any other source of pressure loaded with nitrogen or any other gas, including compressed air, and is provided with a pressure gauge to check the pressure within said pressure source. Another form of activation is by using the diaphragm valve installed in the collector, which derives part of the discharge gas from the first cylinder to the release line to activate the remaining cylinders.

Finally, it should be noted that, to protect the valve (1) during transport and handling of the assembly, the cylinder (4) has a neck flange (17) together with a protective cap.

Also it should be mentioned that preferably the valve (1) has safety means for pressure relief, consisting of a rupture disc (18) communicating with the inlet hole (3).

Having sufficiently described the nature of this invention, as well as how to implement it, it is not considered necessary to further explain to anyone skilled in the art to understand its scope and the advantages derived from it, on the understanding that, in its essence, it may be practised in other embodiments that differ in detail from that shown by way of example, and which will also be covered by the claimed protection provided that its fundamental principle is not changed or modified.

The invention claimed is:

1. A constant flow valve for a fire protection installation controlling discharge of fluid stored under pressure in cylinders (4) said valve comprising a body (2) with a fluid inlet hole (3), configured for being coupled to a mouth of the cylinder (4) containing the pressurized fluid, a fluid outlet hole (5), configured for being coupled to piping of the installation, and a sealing shaft (6) that moves between an open position and a closed position to respectively allow and block the passage of fluid inside the body (2) from the inlet (3) to the outlet (5), wherein movement of the sealing shaft (6) is controlled by a pneumatic release means (7), the release means (7) comprising at least one pneumatic actuation hole (11) that is in fluid communication with a hermetic chamber (10) via a non-return valve (12), the hermetic chamber having a slidable piston (14) disposed therein that transmits motion to the sealing shaft (6) based on a driving pressure exerted in the hermetic chamber (10) by a pressure source (8) via the actuation hole (11) and the non-return valve (12), wherein the fluid pressure at the outlet (5) is regulated by the driving pressure, regardless of the fluid inlet pressure from the cylinder (4), and wherein a release pressure is stored in a hermetic chamber (10) and the release pressure is kept constant during the entire discharge regardless of an inlet pressure of the fluid from the cylinder (4).

2. The constant flow valve according to claim 1, wherein the pressure source (8) of the release means (7) is a cartridge, bottle or any other source of pressure of compressed gas.

3. The constant flow valve according to claim 1, wherein the release means (7) further comprises an actuator (9) external to the body (2) of the valve (1).

4. The constant flow valve according to claim 1 wherein the slidable piston (14) transmits motion to the sealing shaft (6) via a rod (15) that is linked to said sealing shaft (6).

5. The constant flow valve according to claim 1, wherein the sealing shaft (6) of the valve is maintained in the closed position by a spring (16) when the pressure in the hermetic chamber (10) is zero.

6. The constant flow valve according to claim 1, wherein the sealing shaft (6) is arranged perpendicularly to the flow inlet hole (3).

7. The constant flow valve according to claim 5, wherein the actuation hole (11) is arranged perpendicularly to the flow inlet hole (3).

8. The constant flow valve according to claim 1, wherein the outlet hole (5) is axially aligned with the flow inlet hole (3).

9. The constant flow valve according to claim 3, wherein the actuator (9) is of the electric type (91), is of the manual type (92), or a combination thereof.

10. The constant flow valve according to claim 1, where the hermetic chamber (10) is provided in the body (2) of the valve (1).

* * * * *